US006276975B1

(12) United States Patent
Knight

(10) Patent No.: US 6,276,975 B1
(45) Date of Patent: Aug. 21, 2001

(54) TROLLING MOTOR BATTERY GAUGE

(75) Inventor: Steven J. Knight, Madison Lake, MN (US)

(73) Assignee: Johnson Outdoors Inc., Sturtevant, WI (US)

( * ) Notice: Subject to any disclaimer, the term of this patent is extended or adjusted under 35 U.S.C. 154(b) by 0 days.

(21) Appl. No.: 09/590,921

(22) Filed: Jun. 9, 2000

Related U.S. Application Data
(60) Provisional application No. 60/138,890, filed on Jun. 11, 1999.

(51) Int. Cl.[7] .................................................. B63H 21/17
(52) U.S. Cl. ........................................ 440/2; 440/6; 440/7
(58) Field of Search ..................................... 440/1, 2, 6, 7

(56) References Cited

U.S. PATENT DOCUMENTS

| | | |
|---|---|---|
| 2,804,838 | 9/1957 | Moser . |
| 3,598,947 | 8/1971 | Osborn ............................. 200/86.5 |
| 3,807,345 | 4/1974 | Peterson ........................... 115/18 E |
| 3,989,000 | 11/1976 | Foley, Jr. ........................... 115/18 E |
| 3,995,579 | 12/1976 | Childre .............................. 115/18 E |
| 4,151,807 | 5/1979 | Black, Jr. ............................. 114/153 |
| 4,527,983 | 7/1985 | Booth ..................................... 440/7 |
| 4,743,831 | 5/1988 | Young . |
| 5,321,627 | * 6/1994 | Reher ................................... 364/483 |
| 5,465,633 | 11/1995 | Bernloehr .............................. 74/512 |
| 5,470,264 | 11/1995 | Eick ..................................... 440/83 |
| 5,539,399 | 7/1996 | Takahira et al. . |
| 5,686,895 | 11/1997 | Nakai et al. . |
| 5,691,078 | * 11/1997 | Kozaki et al. ......................... 429/92 |
| 5,757,595 | 5/1998 | Ozawa et al. . |
| 5,793,211 | 8/1998 | Shimoyama . |
| 5,798,702 | 8/1998 | Okamoto et al. . |
| 5,801,637 | 9/1998 | Lomholt . |
| 5,808,428 | 9/1998 | Ito et al. . |
| 5,892,338 | 4/1999 | Moore et al. . |
| 5,937,622 | * 8/1999 | Carrier et al. ....................... 56/11.9 |

OTHER PUBLICATIONS

Bass Pro Shops 1997 Catalog, pp. 319–328, Expiration Date: Feb. 1, 1998.
JWA Informational Brochure, pp. 1–52, ©1996.
Motor Guide 2000 Catalog, pp. 1–24, ©1999.

* cited by examiner

*Primary Examiner*—Sherman Basinger
(74) *Attorney, Agent, or Firm*—Foley & Lardner

(57) ABSTRACT

A battery gauge for an electric trolling motor is disclosed. The battery gauge includes a battery that is configured to supply power to the trolling motor. The battery gauge also includes a motor speed setting switch that is configured to supply a signal representative of the motor speed setting. The battery gauge also includes an electronic circuit configured to sense at least one battery parameter that is representative of the battery charge. The electronic circuit is also configured to receive an electrical signal that is representative of the speed setting. The electronic circuit further is configured to determine the remaining battery charge time based on the at least one battery parameter and the speed setting.

27 Claims, 1 Drawing Sheet

TROLLING MOTOR BATTERY GAUGE

The present application claims the benefit of U.S. Provisional Patent Application Ser. No. 60/138,890 entitled TROLLING MOTOR, filed on Jun. 11, 1999 by Darrel A. Bernloehr et al. The present application is also related to co-pending U.S. patent application Ser. No. 09/592,023 entitled TROLLING MOTOR SYSTEM, filed on Jun. 12, 2000 by Steven J. Knight et al.; U.S. patent application Ser. No. 09/592,242 entitled TROLLING MOTOR BOW MOUNT-IMPACT PROTECTION SYSTEM, filed on Jun. 13, 2000 by Steven J. Knight et al.; U.S. patent application Ser. No. 09/591,862 entitled TROLLING MOTOR FOOT CONTROL WITH FINE SPEED ADJUSTMENT, filed on Jun. 12, 2000 by Steven J. Knight; U.S. patent application Ser. No. 09/592,923 entitled TROLLING MOTOR PROPULSION UNIT SUPPORT SHAFT, filed on Jun. 13, 2000 by Steven J. Knight et al.; U.S. patent application Ser. No. 09/590,914 entitled TROLLING MOTOR STEERING CONTROL, filed on Jun. 9, 2000 by Steven J. Knight, U.S. patent application Ser. No. 29/124,838 entitled TROLLING MOTOR FOOT PAD BASE, filed on Jun. 13, 2000 by Steven J. Knight et al.; U.S. patent application Ser. No. 29/124,860 entitled TROLLING MOTOR FOOT PAD PEDAL, filed on Jun. 13, 2000 by Steven J. Knight et al.; U.S. patent application Ser. No. 29/124,846 entitled TROLLING MOTOR MOUNT, filed on Jun. 13, 2000 by Ronald P. Hansen; U.S. patent application Ser. No. 29/124,847 entitled TROLLING MOTOR PROPULSION UNIT SUPPORT SHAFT, filed on Jun. 13, 2000 by Steven J. Knight et al.; U.S. patent application Ser. No. 09/593,075 entitled TROLLING MOTOR BOW MOUNT, filed on Jun. 13, 2000 by Steven J. Knight et al.; and U.S. patent application Ser. No. 29/124,859 entitled TROLLING MOTOR MOUNT, filed on Jun. 13, 2000 by Ronald P. Hansen; the full disclosures of which, in their entirety, are hereby incorporated by reference.

FIELD OF THE INVENTION

The disclosure relates to a battery gauge for a battery-powered electric trolling motor of the type which is commonly mounted to the bow of a fishing boat. Further, the disclosure relates to a battery gauge for an electric trolling motor which displays the amount of running time remaining at the current speed setting of the motor before the battery loses its charge, thereby allowing the user to adjust the speed setting accordingly.

BACKGROUND OF THE INVENTION

Fishing boats and vessels are often equipped with a trolling motor for providing a relatively small amount of thrust to slowly and quietly propel the boat or vessel while the operator is fishing. The motor is typically mounted to the bow of the boat (alternatively the motor may be mounted at other locations in the boat, for example the motor may be transom mounted at the stern of the boat) so that the thrust pulls the boat through the water. The power source for the trolling motor is usually a lead-acid marine battery having a limited capacity measured by the amount of amp-hours that the battery is capable of providing. The limited battery capacity limits the combination of trolling motor speed and time available to the fisherman. For a predetermined state of charge on the battery, the fisherman can troll for a relatively long amount of time at low speed (i.e., low-power usage), or for a relatively short amount of time at high speed (i.e., high-power usage). When the battery is discharged, the fisherman needs to stop his trolling operations until such time that the battery can be charged. Unfortunately, prior art trolling motors do not provide these fisherman with a reliable way of determining how long the battery will last until it needs to be recharged. Thus, the fisherman may find that the battery power is depleted well before the end of the fishing day.

Some trolling motors provide information related to the trolling motor battery condition, to the operator, by measuring and displaying the percentage charge of the battery. The display may be in the form of a bar graph having a number of segments corresponding to the percentage of charge (e.g., four out of ten segments may be lighted to indicate a 40 percent charge), or alternatively the display may be in a numerical percentage charge of the battery. Based on the display, an operator may attempt to roughly estimate the amount of running t me remaining based on his prior experience with the boat and trolling motor at different operating speed conditions. The display, however, does not provide an accurate indication of the amount of running time remaining before the battery will be discharged. This defect results from the fact that the amount of current drawn from the battery will depend on the speed settings of the trolling motor. As the speed setting, and thus propeller speed, changes, the current usage will vary in a very wide range (e.g., from 1 amp to 50 amps). Thus, for example, a 40 percent charge may last two hours with the motor operating at its maximum speed, but may last for eight hours if the speed is cut back to a slower trolling speed. Therefore, even an experienced operator will be able to make only a very inaccurate estimate of the amount of running time left using existing battery gauges, and will only be able to guess what speed setting will correspond to the amount of time that he wishes to continue trolling.

Accordingly, there is a need for an improved battery gauge for an electric trolling motor which determines the amount of running time remaining at the current speed setting of the trolling motor before the battery loses its charge, and displays this running time. Further, there is a need for a battery gauge in which the operator will know how much longer he may continue to troll at the current speed setting. Further still, there is a need for a battery gauge for an electric trolling motor which provides information of which the user can use to adjust the speed setting to decrease the current draw and conserve battery power if insufficient running time is available at the current speed setting, avoiding the possibility of running out of battery power too early.

SUMMARY OF THE INVENTION

An exemplary embodiment relates to a battery gauge for an electric trolling motor. The battery gauge includes a battery configured to supply power to the trolling motor. The battery gauge also includes a motor speed setting switch configured to supply a signal representative of the motor speed setting. Further, the battery gauge includes an electronic circuit configured to sense at least one battery parameter representative of the battery charge. The electronic circuit is configured to receive an electrical signal representative of the speed setting. The electronic circuit is configured to determine the remaining battery charge time based on the at least one battery parameter and the speed setting.

Another exemplary embodiment relates to an electric trolling motor. The electric trolling motor includes a propulsion unit configured to provide thrust and having a motor. The electrical trolling motor includes a steering unit, coupled to the propulsion unit for steering the propulsion unit. The electric trolling motor further includes a battery configured to supply power to the propulsion unit. Further still, the electric trolling motor includes a motor speed setting switch coupled to the motor and configured to supply a signal representative of the motor speed setting. Yet further still, the electric trolling motor includes an electronic circuit configured to sense at least one battery parameter representative of the battery charge, and the electronic circuit is configured to receive an electrical signal representative of the speed setting. The electronic circuit is configured to determine the remaining battery charge time based on the at least one battery parameter and the speed setting.

Yet another exemplary embodiment relates to a method of providing an indication of battery charge for a trolling motor. The method includes sensing at least one battery parameter of a trolling motor battery. The battery parameter is representative of battery charge. The method also includes receiving, by a processing circuit, the at least one battery parameter. The method further includes, receiving, by the processing circuit, a signal representative of a trolling motor speed setting. Further still, the method includes computing, by the processing circuit, a battery charge time based on the at least one battery parameter and the trolling motor speed setting.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF EXEMPLARY EMBODIMENTS

Figure 1:
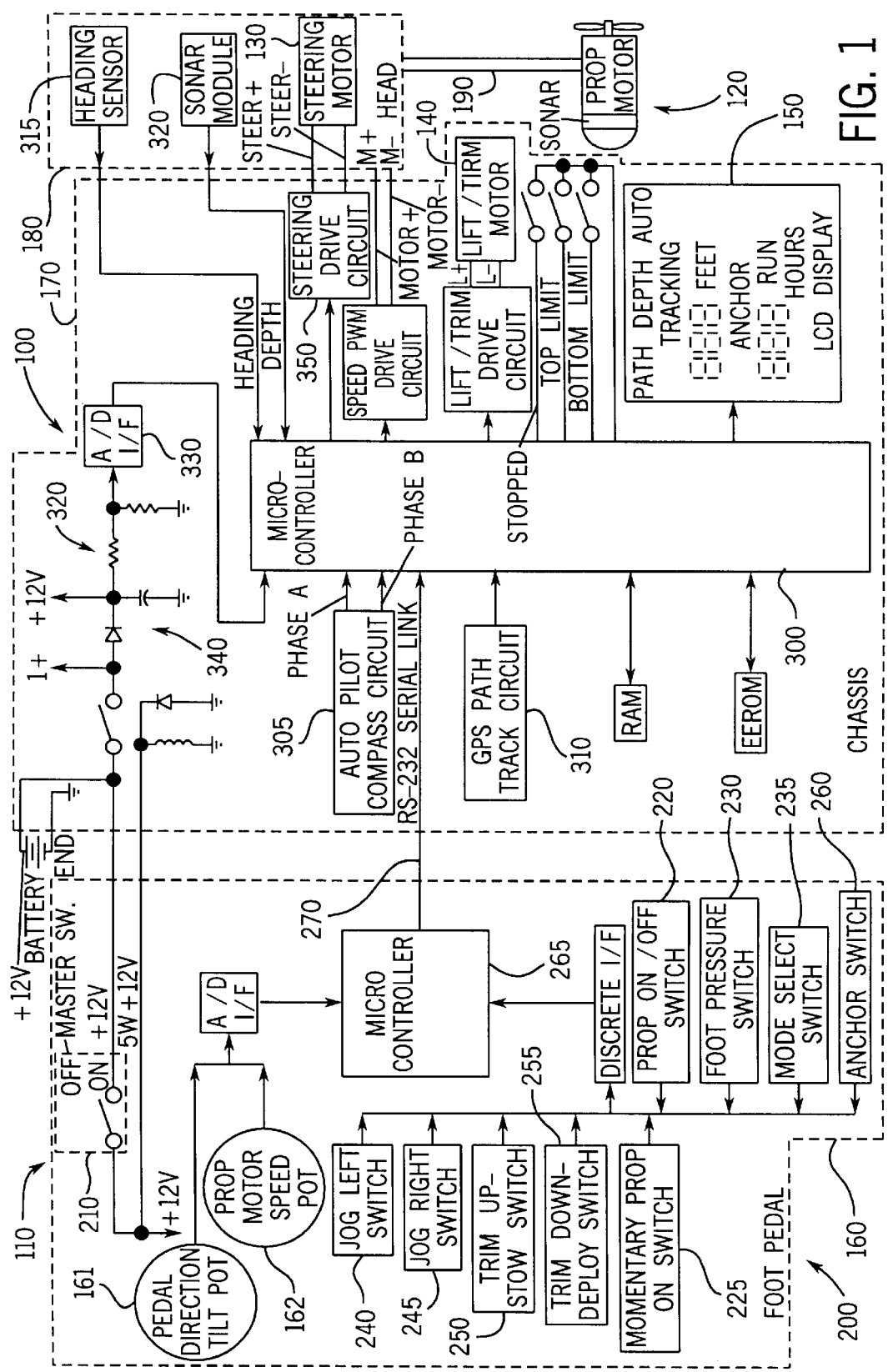
FIG. 1 is a block diagram of an exemplary embodiment of a trolling motor system.

Referring to FIG. 1, a trolling motor system 100, is depicted. Trolling motor system 100 includes a battery 110 for providing electric power to a prop motor 120, a steering motor 130, a lift motor 140, and a display 150. Trolling motor system 100 also includes a foot pedal assembly 160 with input devices for controlling the operation of trolling motor system 100. Trolling motor system 100 further includes a chassis 170 for mounting trolling motor system 100 to a boat. Further still, trolling motor system 100 includes a head 180 coupled to prop motor 120 via a rotatable shaft 190.

In an exemplary embodiment, battery 110 is a 12 volt lead-acid marine battery with limited capacity (typically 105 amp-hours). Also, in an exemplary embodiment, foot pecal assembly 160 includes a pedal direction (tilt) potentiometer 161 for sensing the rotational position of a foot pad used to set a desired steering direction. Foot pedal assembly 160 also includes a prop motor speed potentiometer 162 for sensing the rotation of an actuatable knob used to select a prop motor speed.

Further, in an exemplary embodiment, foot pedal assembly 160 includes ten actuatable switches 200. Switches 200 include a master switch 210 used to control a relay in the chassis which, in turn, controls application of power from the battery to the rest of system 100. Other switches include, a prop on/off switch 220 for turning the prop on and off; a momentary prop on switch 225 for turning the prop on momentarily; a foot presence switch 230 which indicates whether the operator's foot is on or off foot pedal assembly 160; a mode select switch 235 for selecting an operating mode; a jog left switch 240 for allowing a user to make small or large corrections to the desired bearing, jog left switch 240 being a momentary switch which operates steering motor 130 at a reduced speed; a jog right switch 245 which allows a user to make small or large corrections to the desired bearing, jog right switch 245 being a momentary switch which operates steering motor 130 at a reduced speed; a trim-up stow switch 250, which is a momentary switch allowing upward trim of the motor or stowage of the motor; a trim down-deploy switch 255 providing trim down of the motor or deployment of the motor if stowed; and an anchor switch 260 configured to toggle on or off the power anchor function.

In an exemplary embodiment, foot pedal assembly 160 also includes a micro-controller 265 that is configured to read the settings of potentiometers 161 and 162 and switches 200 (except, in an exemplary embodiment, for the master power switch which may not be coupled to microcontroller 265), and is configured to communicate data representative of switch 200 positions via a serial communications link 270 to chassis 170. Any of a variety of configurations to communicate information from foot pedal 160 may be used, including, but not limited to, serial link 270, which is shown as an RS-232 communications link, however other configurations such as parallel communications links, and the like, may also be used.

Chassis 170 houses a motherboard including a second microcontroller 300 which is configured to receive input data from foot pedal 160 along serial link 270. Microcontroller 300 is also configured to receive signals from an auto pilot compass circuit 305 and a global positioning system (GPS) path track circuit 310 in chassis 170. Microcontroller 300 further is configured to receive heading and depth signals from a heading sensor 315 and a sonar module 320 which are mounted in head 180. Chassis microcontroller 300 is configured to execute appropriate control algorithms to process various inputs, generate control signals for controlling the steering motor 130, lift/trim motor 140, and prop motor 120, via appropriate output drive circuits. In an exemplary embodiment, micro-controller 300 has access to random access memory (RAM) and electronically erasable programmable read only memory (EEPROM), also generates control signals to produce visible indicia, such as, but not limited to, the available amount of running time at the current prop motor speed setting before the battery needs to be recharged, on LCD display 150.

In an exemplary embodiment, remaining running time is displayed (in tenths of an hour) on LCD display 150 based on the "no load battery voltage" (i.e., open-circuit voltage), time, and prop speed currently selected by the setting of the prop motor speed potentiometer. To determine remaining running time, in an exemplary embodiment, certain assumptions are made. For example, battery 110 is assumed to be a 105 amp-hour marine battery in good condition at a temperature of 80 degrees Fahrenheit. The accuracy of any calculations of remaining run time are diminished to the extent that the assumptions are not met. For example, the accuracy may be diminished if the battery is new or nearly worn out (i.e., in poor condition), if a different type or size (i.e., capacity) a battery 110 is used, or if battery 110 is operated at a different temperature. In alternative embodiments, one or more sensors may be added to detect some of these conditions (e.g., temperature), and make appropriate corrections in the software.

When prop motor 120 is turned off (i.e., prop on/off and momentary prop on switches are in their off positions), and after delay time (determined as described below), microcontroller 300 measures the "no load battery voltage" (i.e., open-circuit voltage from the battery), and uses this value as an index to lookup a "state of charge" (SOC) in amp-hours from an "SOC table" stored in memory (e.g., EEPROM). Micro-controller 300 also reads the selected prop motor speed setting from potentiometer 162, and uses this value as an index to lookup a "motor current" in a "motor current table" stored in the memory. In an exemplary embodiment, a 100 millisecond loop, remaining run time (in tenths of hours) is computed and displayed using equation:

$$\text{Run Time(Hr} * 10) = \frac{\text{SOC(amp-hours} * 100)}{\text{Motor Current(amp} * 100)} * 10 \quad (1)$$

In an exemplary embodiment, the "SOC table" contains "state of charge" values in amp-hours times 100 for improved accuracy, providing 0.01 hour resolution across a range from 0.1 hours (i.e., 10 in the table) to over 200.0 hours (i.e., 20,000 in the table). The table itself contains twenty entries, or one entry for each of the twenty possible no load voltages from 11.7 volts to 12.7 volts that an 8-bit A/D converter can measure with a resistor divider network which divides the input battery voltage by 2.54.

In an exemplary embodiment, the "motor current table" contains motor currents in amps times 100 for improved accuracy, thereby providing 0.01 amp resolution across the range of 1 amp (i.e., 100 in the table) to 50 amps (i.e., 5,000 in the table). The table will contain 256 entries, one for each of 256 possible prop motor speed settings. The value of the "motor current" values depends on prop motor 120 being used, and different tables may be used for different motors.

In an exemplary embodiment, when prop motor 120 is turned on, micro-controller 300 stops measuring the "no load battery voltage" and retains the last state of charge value which was obtained when prop motor 120 was turned off. Further, when prop motor 120 is turned on, a memory location is cleared that is used to store the total charge used. From the initial point when the motor is turned on, every one second, micro-controller 300 uses the prop motor speed setting as an index to the "motor current table" to lookup the present motor current, and further uses the table value to compute the charge used (CU) during that one second interval in amp-seconds using equation:

$$CU(\text{amp-sec}) = \text{Motor Current (amp)} * 1 \text{ sec} \quad (2)$$

Every one second, micro-controller 300 accumulates the total charge used (TCU) as follows:

$$TCU = TCU + CU(\text{amp-sec}) \quad (3)$$

where TCU is a 3-byte binary result in amp-seconds (1–378,000 amp-seconds, where 378,000 amp-seconds equals 105 amp-hours). Then, running time is computed every 100 milliseconds in tenths of an hour using the following equation:

$$\text{Run Time(Hr} * 10) = \frac{\text{SOC(amp-hours} * 100) - (TCU(\text{amp-sec}) * 100 / 3600 \text{ sec/Hr})}{\text{Motor Current(amp} * 100)} * 10 \quad (4)$$

Thus, the last measured no load battery voltage (used to determine the state of charge) is used repeatedly as long as prop motor 120 is left on. It is also assumed that prop motor 120 will be turned off periodically (e.g., every 30 minutes) such that the state of charge can be updated using a new measured no load battery voltage.

In an exemplary embodiment, the no load battery voltage is measured using a one percent resistor divider network 320 using 2.55 K Ohms and 5.11 K Ohm resistors to divide the battery voltage by 3.0039. The divided voltage is digitized using a ten-bit A/D interface 330 referenced to 5 volts to provide 4.8 millivolt resolution or 14.67 millivolt resolution at the 12 volt input to the divider to provide 68 A/D readings from 11.7 volts to 12.7 volts. A/D interface 330 may be provided on micro-controller 300 itself (if, e.g., an Atmel 8535 micro-computer is used as the chassis micro-controller, in an exemplary embodiment), or may be a separate A/D converter. A hardware filter 340 is preferably used to reject high frequency noise on the 12 Volt battery voltage input. In addition, software filtering is performed every 100 milliseconds, performing an A/D conversion to measure the present voltage, adding the converted value to four previous voltage values already stored in RAM, and dividing the sum by five. These steps insure that each measurement of the no load battery voltage is the average of five voltage measurements taken at 100 millisecond intervals which results in filtering out noise and improving the accuracy and resolution of the A/D conversion. However, it should be noted that any of a variety of filtering techniques, including, but not limited to the filtering techniques described above, may be used to improve the accuracy and resolution of the A/D conversion. To prepare for the next measurement, four previous voltage values stored in RAM are shifted (deleting the oldest value) and the present digitized voltage is stored as the newest value. By deleting the oldest value, any residual affect of a single bad reading will be completely eliminated in 0.5 seconds. Again, other arrangements and techniques, such as, but not limited to integral, filtering, and smoothing techniques, may be used to remove the residual affect of any single bad readings.

As noted above, micro-controller 300, in an exemplary embodiment, waits for a delay time after prop motor 120 is turned off, before measuring the no load battery voltage and updating the state of charge. The delay time allows the no load battery voltage to stabilize after prop motor 120 is turned off, which typically takes between 1 and 5 seconds. In an exemplary embodiment, micro-controller 300 waits until four voltage values are stored in RAM that are all approximately equal (i.e., within plus/minus 44 milliVolts or three LSB of the A/D) before measuring the no load battery voltage. Also, as noted above, the running time is computed and displayed every 100 milliseconds on display 150 with prop motor 120 turned on or off. When prop motor 120 is on, the state of charge is assumed to decrease directly with time. Therefore, if prop motor 120 speed setting is not changed, the displayed running time will decrement every 0.1 hours (i.e., every 6 minutes), subject only to the accuracy of the timing circuit of micro-controller 300, however, when prop motor 120 is turned off, the displayed run time may jump up or down because the actual state of charge is measured again, and the measurement may differ from the assumed linear (time based) discharge. The displayed run time will be most accurate when prop motor 120 is off. Thus, to obtain the most accurate run time, in an exemplary embodiment, the operator can simply turn off prop motor 120 and wait about five seconds for the no load battery voltage to stabilize. If the jump is too large, software filtering may be used to "mask" the actual state of charge to avoid having too large a difference from the previous value to avoid confusion at the expense of accuracy.

When the computed run time reaches zero (with prop motor 120 on or off), the display signal from micro-controller 300 will cause LCD display 150 to display "RES"

for "reserve". At this point, the user will be instructed to stop using the battery to prevent a deep discharge cycle that can reduce the life of battery 110. Continued use in the reserve domain will reduce the battery life by reducing the number of charge/discharge cycles remaining. "RES" continues to be displayed as long as the power is left on. However, if the user then turns master power switch 210 off, microcontroller 300 will lose track of the accumulated time and, when power is reapplied, it is possible that display 150 may show a run time greater than zero. After being turned back on, the system will measure the no load battery voltage and will compute a new run time remaining as described above. To prevent this loss of information, in an exemplary embodiment, the accumulated time and/or the "reserve" condition is stored in non-volatile memory (e.g., EEPROM).

In an exemplary embodiment described above, motor current is determined using the setting of prop motor speed potentiometer 162 as an index to a table which correlates speed of prop motor 120 to current being drawn from battery 110 under those conditions. In an alternative embodiment, a current sensor (e.g., a current-sense resistor and A/D) may be used to measure the actual current being drawn from the battery, or the actual current being drawn by the prop motor. The advantage of this technique is that the accuracy of the motor current measurement may be increased. The disadvantage however is that, when the prop motor is turned off (e.g., when the fisherman is still at home with the prop out of the water), the run time cannot be determined since no current is being drawn. In another embodiment, these two techniques can be combined, with the setting of the prop motor speed potentiometer used to determine the current draw with the prop motor off, and the measured current draw used with the motor on.

In an alternative embodiment, micro-controller 300 may be programmed or configured to calculate an approximate distance of travel based on the remaining battery charge time and the speed setting. The distance of travel may then be displayed on display 150. Further, in an exemplary embodiment, the distance of travel calculated may also be displayed on a display map, which may be shown on display 150, and used, in particular, but not limited to a GPS based path tracking system. Further still, micro-controller 300 may be programmed to calculate or estimate the distance of travel remaining based on the remaining battery charge time and the current motor speed (revolutions per minute (rpm)). The estimate may be further augmented by utilizing operator input, such as boat size, boat weight, wind, wave conditions, etc. Some of the information utilized, in particular, boat parameters may be stored in memory or in a look-up table. Yet further still, micro-controller 300 may be programmed to provide a warning signal to the operator, to notify the operator when it is time to begin heading back to home (or any reference point) based upon GPS signals and based upon the calculated or estimated distance of travel remaining. The system is however not limited to GPS, but may utilize any other type of sensed, derived, calculated, or estimated distance from home to base the alarm signal on.

While the detailed drawings, specific examples, and particular formulations given describe exemplary embodiments, they serve the purpose of illustration only. The materials and configurations shown and described may differ depending on the chosen performance characteristics and physical characteristics of the trolling motor system and its associated electronics. For example, the type of processors, electronic circuits, or software used may differ. The systems shown and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A battery gauge for an electric trolling motor comprising:
    a battery configured to supply power to the trolling motor;
    a motor speed setting switch configured to supply a signal representative of the motor speed setting; and
    an electronic circuit configured to sense at least one battery parameter representative of the battery charge, and the electronic circuit configured to receive an electrical signal representative of the speed setting, the electronic circuit configured to determine the remaining battery charge time based on the at least one battery parameter and the speed setting.

2. The battery gauge of claim 1, wherein the battery is a 12 Volt battery.

3. The battery gauge of claim 1, wherein the battery is a lead-acid battery.

4. The battery gauge of claim 1, further comprising:
    a display configured to provide an indication of the time of battery charge remaining.

5. The battery gauge of claim 1, wherein the electronic circuit includes a micro controller.

6. The battery gauge of claim 1, wherein the at least one battery parameter includes the no load battery voltage.

7. The battery gauge of claim 1, wherein the electronic circuit includes a state of charge look up table.

8. The battery gauge of claim 1, wherein the electronic circuit includes a motor current look up table.

9. The battery gauge of claim 1, wherein an approximate travel distance remaining may be calculated based on the remaining battery charge time and the speed setting.

10. The battery gauge of claim 1, wherein an approximate travel distance remaining may be calculated based on the motor speed.

11. The battery gauge of claim 10, wherein the approximate travel distance remaining may be calculated based on operator inputs.

12. The battery gauge of claim 10, wherein the approximate travel distance remaining may be calculated based on boat parameters.

13. The battery gauge of claim 10, wherein an alarm may be provided based on a distance from a reference point and the approximate travel distance remaining.

14. An electric trolling motor comprising:
    a propulsion unit configured to provide thrust and having a motor;
    a steering unit, coupled to the propulsion unit for steering the propulsion unit;
    a battery configured to supply power to the propulsion unit;
    a motor speed setting switch coupled to the motor and configured to supply a signal representative of the motor speed setting; and
    an electronic circuit configured to sense at least one battery parameter representative of the battery charge, and the electronic circuit configured to receive an electrical signal representative of the speed setting, the electronic circuit configured to determine the remaining battery charge time based on the at least one battery parameter and the speed setting.

15. The electric trolling motor of claim 14, further comprising:
a display configured to provide an indication of the time of battery charge remaining.

16. The electric trolling motor of claim 14, wherein the electronic circuit includes a micro controller.

17. The electric trolling motor of claim 14, wherein the at least one battery parameter includes the no load battery voltage.

18. The electric trolling motor of claim 14, wherein the electronic circuit includes a state of charge look up table.

19. The electric trolling motor of claim 14, wherein the electronic circuit includes a motor current look up table.

20. The electric trolling motor of claim 14, wherein the electronic circuit is configured to compute run time based on state of charge divided by motor current.

21. The electric trolling motor of claim 14, wherein the electronic circuit is configured to compute run time based on state of charge minus total charge used, that difference divided by motor current.

22. A method of providing an indication of battery charge for a trolling motor, comprising:
sensing at least one battery parameter of a trolling motor battery, the battery parameter being representative of battery charge;
receiving, by a processing circuit, the at least one battery parameter;
receiving, by the processing circuit, a signal representative of a trolling motor speed setting;
computing, by the processing circuit, a battery charge time based on the at least one battery parameter and the trolling motor speed setting.

23. The method of claim 22, further comprising:
sensing the no load battery voltage.

24. The method of claim 23, further comprising:
looking up in a table, the state of charge for the battery.

25. The method of claim 22, further comprising:
looking up the motor current in a table.

26. The method of claim 25, further comprising:
accumulating the total charge used.

27. The method of claim 22, further comprising:
providing a signal to indicate reserve power is being used.

* * * * *